United States Patent [19]
Khan et al.

[11] Patent Number: 5,946,165
[45] Date of Patent: Aug. 31, 1999

[54] DIMPLE-FREE DISK DRIVE SUSPENSION

[75] Inventors: Amanullah Khan, Temecula; Chu Wong, Huntington Park, both of Calif.

[73] Assignee: Magnecomp Corporation, Temecula, Calif.

[21] Appl. No.: 09/035,177

[22] Filed: Mar. 4, 1998

Related U.S. Application Data

[60] Provisional application No. 60/074,728, Feb. 13, 1998.

[51] Int. Cl.⁶ .................................................. G11B 5/60
[52] U.S. Cl. ............................................................ 360/104
[58] Field of Search .................................................. 360/104

[56] References Cited

U.S. PATENT DOCUMENTS 4,811,143  3/1989  Ohashi et al. .......................... 360/104

*Primary Examiner*—Robert S. Tupper
*Attorney, Agent, or Firm*—Louis J. Bachand

[57] ABSTRACT

In a disk drive suspension the load beam is tapered to a tip and the tip is radiused to form a gimbaling locus for a flexure tongue in lieu of conventional dimple constructions.

12 Claims, 2 Drawing Sheets

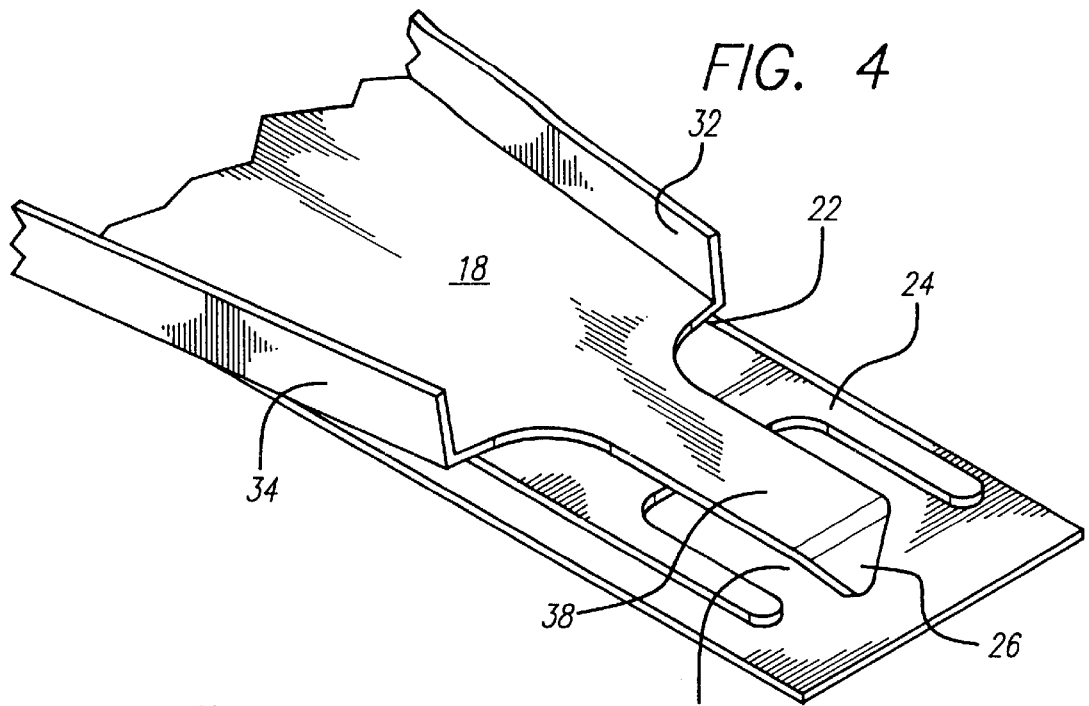
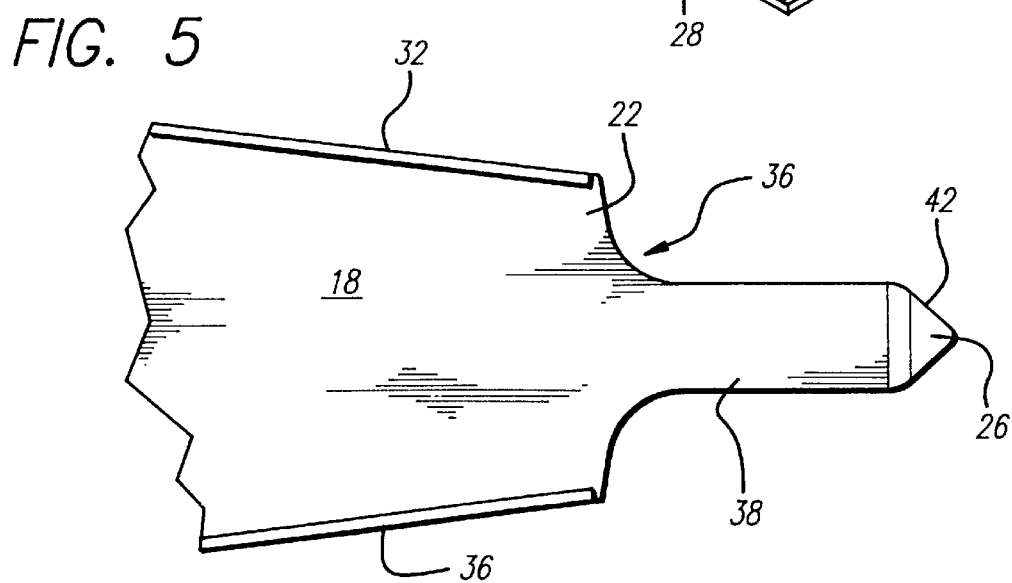
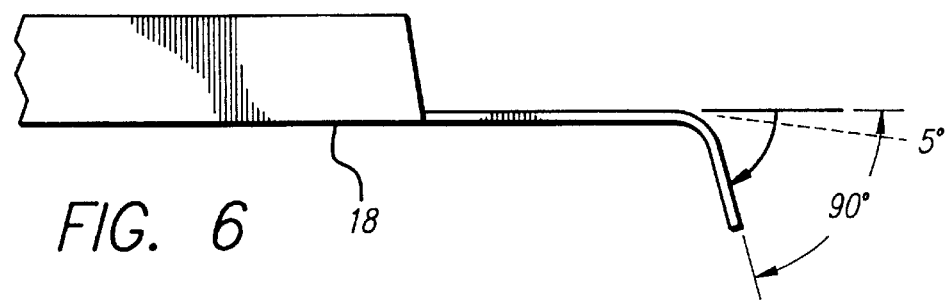

DIMPLE-FREE DISK DRIVE SUSPENSION

REFERENCE TO RELATED APPLICATIONS

This application claims the benefit of United States Provisional Application Ser. No. 60/074,728, filed on Feb. 13, 1998.

FIELD OF THE INVENTION

This invention relates to disk drive suspensions, and more particularly, to an improved load beam and flexure combination for a disk drive suspension in which there is no dimple on either the load beam or the flexure, but the gimbaling function is preserved by using a specially shaped load beam tip to replace the conventional dimple construction. Advantages include having greater freedom to determine the optimum slider angle, and increased headroom above the slider for wiring or the like.

BACKGROUND OF THE INVENTION

Disk drive suspensions commonly use a load beam and flexure assembly to carry a slider and read-write head adjacent a disk surface. These suspensions provide a pivot on the load beam or the flexure, or both, so that the slider can gimbal, or pivot in all directions. Gimbaling action allows the slider to rotate about its axis to follow disk contour and is very important to suspension performance. The pivot is conventionally defined by a dimple which is a rounded protuberance formed in the metal of the flexure of load beam. The dimple is used to apply a force to the slider from the load beam to position the slider at the desired height from the disk.

Formation of a dimple on a load beam is typically by stamping the semi-spherical shape in the load beam. Dimple formation requires surrounding support structure and this structure limits the volume of space around the dimple, while the need to deflect the dimple from the general plane of the load beam limits the height that can be achieved by the deflection. The flexure is attached to the load beam by laser weld or other means in a manner that the central part of the flexure, the flexure tongue, is in contact with the beam dimple, which permits the tongue, to which the slider is affixed, to pivot. In some case, the dimple is formed on the flexure tongue. Upon attaching the flexure to the load beam the flexure tongue will be able to pivot about the dimple.

It is also known to define a dimple by etching the load beam to define a stud but thinness of the load beam material imposes severe limits on the size of such studs, to below a desirable size.

SUMMARY OF THE INVENTION

It is desirable to have a dimple height of 0.004 to 0.006 inch to have sufficient reaction force, i.e. the pressure exerted against the dimple, to keep the flexure tongue in contact with the load beam, to establish the pitch angle of the tongue relative to the load beam, and where applicable to maintain sufficient head room about the dimple contact locus. The trend in suspension design is to be smaller and smaller. The area necessary to form a dimple is being lost as diminution in suspension size continues. The dimple is a physical form that requires a certain width to have a certain height as presently formed. A particular height is required to obtain the desired force on the flexure tongue and to deflect the flexure tongue sufficiently to create the needed pressure on and desired static attitude of the slider. Some sliders have their electrical connection pads at the back of the slider, i.e. on the slider face opposite the load beam and remote from the disk surface; and a volume of space about the dimple must be preserved for wires attached there. If the load beam has a small dimple, e.g. of 0.015 to 0.020 inch in diameter, it is difficult to keep the volume of space needed. Similarly, a dimple on the flexure may consume the space volume needed for wiring to the contact pads on the slider. An etched stud type of dimple can be made very small, but its height is limited and not generally sufficient to produce the contact pressure needed to keep the flexure tongue and load beam together, as required in a three-piece suspension wherein the flexure is not part of the load beam at the outset.

It is an object of the invention to provide an improved load beam and flexure assembly in which the pressure typically exerted by a dimple is provided by a modification of the load beam into a rounded tip. It is another object of the invention to provide a modified load beam in which the distal end is tapered and forms a tip, the tip being radiused and engaged with the flexure tongue for maintaining a slider at a desired height and attitude.

These and other objects of the invention, to become apparent hereinafter are realized in a disk drive suspension having a load beam with a base portion, a spring portion and an elongated beam portion having a distal terminus, a flexure supported by the beam portion, the flexure including a tongue portion opposite the beam portion distal terminus for connection to a slider flying above a disk surface, the beam portion distal terminus being narrowed to a tip, the tip being radiused to define a gimbal locus, the beam portion tip being constructed and arranged to exert force against the flexure tongue portion toward the disk surface while permitting gimbaling movement of the tongue portion.

In this and like embodiments, typically, the beam portion tip is angled from the plane of the beam portion toward the flexure tongue, the load beam portions and the tip are unitary and formed from a common web of metal; the beam portion has left and right edge rails terminating adjacent the beam portion distal terminus, the terminus having a tapered continued extent beyond the edge rails leading to the tip, the beam portion has left and right edge rails terminating adjacent the beam portion distal terminus, the beam portion having a first tapered continued extent beyond the edge rails to define an arm of lesser width than the beam portion projecting from the terminus generally in the plane of the beam portion, and supported by the arm a second tapered continued extent to define the tip, the second continued extent and its the tip is deflected toward the flexure tongue portion to engage the tip, the beam portion tip is angled from the plane of the beam portion first tapered continued extent at an angle between about 5 and 90 degrees relative to the plane of the first tapered continued extent, and/or the tip has a radius of about 0.003 to about 0.005 inch.

In a more particularly preferred embodiment, the invention provides a disk drive suspension having a spring metal load beam with a base portion, a spring portion and an elongated beam portion having a distal terminus, a flexure attached to the load beam beam portion, the flexure including a center tongue portion opposite the beam portion distal terminus for connection to a slider flying above a disk surface, the beam portion distal terminus being extended and narrowed outward from the beam portion to terminate in a tip having generally the thickness of the beam portion, the outermost portion of the distal terminus being narrowed to a tip and deflected so that its tip lies at an angle from about 5 to about 90 degrees to the plane of the beam portion, the tip being radiused to define a gimbaling locus, the beam portion tip being constructed and arranged to exert force against the flexure tongue portion toward the disk surface while permitting gimbaling movement of the tongue portion.

In this and like embodiments, typically, the flexure tongue and the beam portion and its continued extent are free of dimple formations.

In its method aspects the invention provides the method of resiliently urging a flexure tongue toward a disk surface, including supporting a flexure carrying the flexure tongue from a load beam, tapering the load beam distal end to a tip, radiusing the tip of the load beam, and engaging the radiused load beam tip against the flat of the flexure tongue to urge the flexure tongue toward a disk surface in gimbaling relation.

BRIEF DESCRIPTION OF THE DRAWINGS

The invention will be further described as to an illustrative embodiment in conjunction with the attached drawing in which:

FIG. 4 is fragmentary perspective view of the invention;

FIG. 5 is a fragmentary plan view; and

FIG. 6 is a schematic view showing the angle of the tip to the load beam.

DETAILED DESCRIPTION OF THE INVENTION

Figure 1:
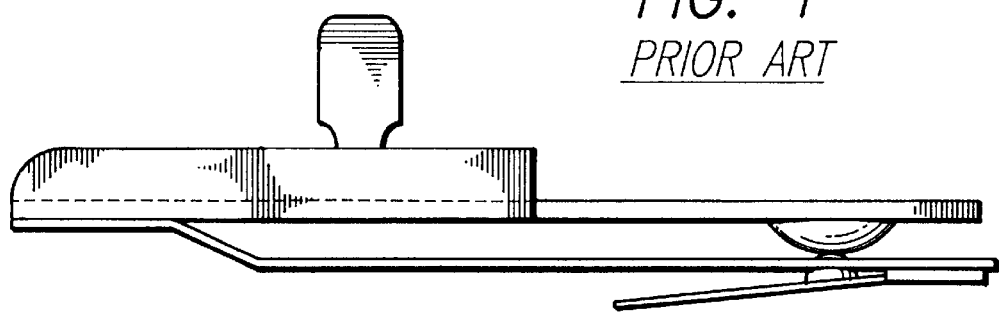
FIG. 1 is a side elevation view of a PRIOR ART suspension in which pressure is applied to the flexure tongue by a load beam dimple.
Figure 2:
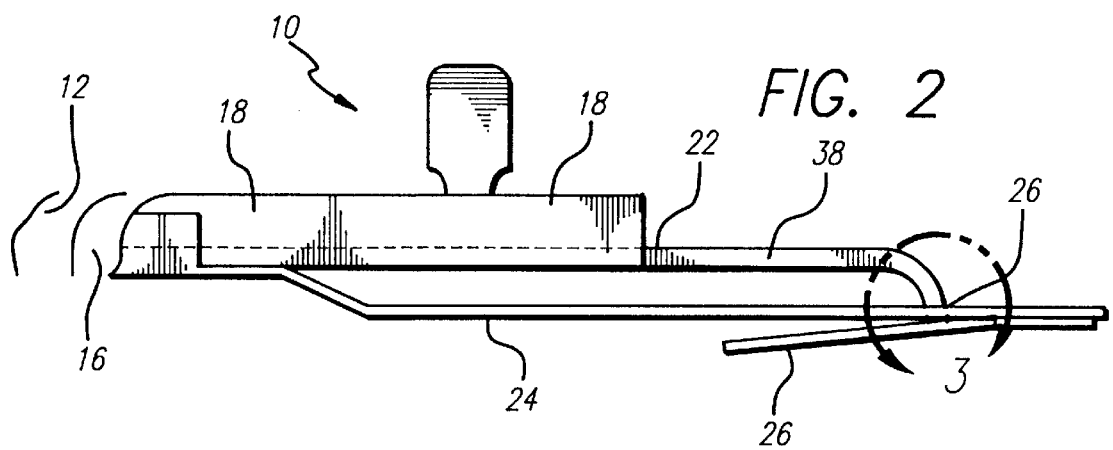
FIG. 2 is a side elevation view of the invention suspension.
Figure 3:
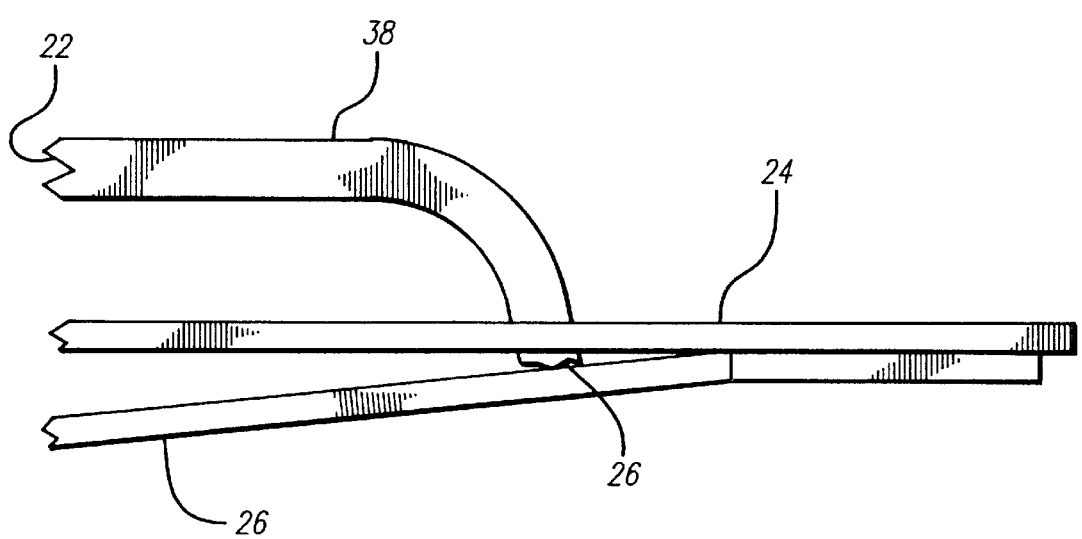
FIG. 3 is a view taken on line 3 in FIG. 2.

The invention provides a very narrow pressure point to apply force from the load beam to the flexure and slider by narrowing and tapering the load beam distal terminus into a small tip, radiusing the tip end, and bending the tip at an angle to the load beam in position to engage the flexure tongue thereopposite. Advantages of the narrow tip and its projection from the load beam end include a wide variability in the extension of the tip so that "dimple" size is not limited by the amount of deflection that the load beam wall will tolerate. Greater or lesser extension of the tip will result in more or less of a pitch angle for the flexure tongue within wide design limits. Further, the tip is literally a projection of the load beam end and no surrounding structure is need in contrast to a traditional dimple structure. This absence of surrounding structure leaves adequate room, or head space in the vicinity of the tip for wiring to be attached to pads on the back of the slider, or to be run from some other location. With reference to the drawings, in FIG. 1 a conventional load beam and flexure assembly is shown in which the dimple on the load beam exerts the necessary pressure on the flexure tongue.

In FIGS. 2–6, the invention disk drive suspension 10 comprises a load beam 12 with a base portion 14, a spring portion 16, and an elongated beam portion 18. Beam portion 18 has an outer or distal terminus 22. Flexure 24 is supported by the beam portion 18. Flexure 24 includes a tongue portion 26 opposite the beam portion distal terminus 22 for connection to a slider (not shown) flying above a disk surface. The beam portion distal terminus 22 is narrowed and tapered to a tip 26. Load beam beam portion tip 26 is radiused to a small rounded structure of minimum radius and defines a gimbal locus. Tip 26 is positioned to exert a desired pressure or force against the flexure 24, specifically against the tongue 28 of the flexure, to urge the tongue, and the slider carried thereby (not shown) toward the disk surface while permitting gimbaling movement of the tongue portion about the tip in the manner of movement about a dimple, so as to enable the slider to maintain its appropriate attitudes.

The beam portion tip 26 is angled from the plane of the beam portion toward the flexure tongue at an angle of about 5 degrees to about 90 degrees. The load beam base, spring and beam portions 14, 16 and 18, respectively, and the tip 26 are unitary and formed from a common web of metal such as stainless steel.

Beam portion 18 is shown with left and right edge rails 32, 34 terminating adjacent the beam portion distal terminus 22. The terminus 22 has a first tapered continued extent 36 beyond the edge rails 32, 34 leading to the tip 26. First tapered continued extent 36 defines an arm 38 of lesser width than the beam portion 18 projecting from the terminus 22 generally in the plane of the beam portion. Supported by the arm 38 is a second tapered continued extent 42 that defines the tip 26. The second continued extent 42 and tip 26 is deflected toward the flexure tongue 28 to engage the tip with the tongue. Thus, the beam portion 18 has a tip 26 angled from the plane of the beam portion first tapered continued extent 36 at an angle between about 5 and 90 degrees relative to the plane of the first tapered continued extent. Typically the tip has a radius of about 0.003 to about 0.005 inch.

In will be noted that in the invention embodiments the flexure tongue 28 and beam portion 18 and its continued extents 36, 42 are free of dimple formations.

The operation of the invention is that the load beam resiliently urges the flexure tongue 28 toward a disk surface by supporting a flexure 24 carrying the flexure tongue 28 from a load beam beam portion 18, the load beam distal terminus 22 being narrowed and tapered to a tip 26 which has been radiused, and engaging the radiused load beam tip against the flat 44 of the flexure tongue 28 to urge the flexure tongue toward a disk surface in gimbaling relation.

The invention thus provides an improved load beam and flexure assembly in which the pressure typically exerted by a dimple is provided by a modification of the load beam into a rounded tip which engages the flexure tongue for maintaining a slider at a desired height and attitude.

The foregoing objects are thus met.

We claim:

1. Disk drive suspension having a load beam with a base portion, a spring portion and an elongated beam portion having a distal terminus and edge rails terminating adjacent said beam portion distal terminus, a flexure supported by said beam portion, said flexure including a tongue portion opposite said beam portion distal terminus for connection to a slider flying above a disk surface, said beam portion having a first tapered continued extent beyond said edge rails to define an arm of lesser width than said beam portion projecting from said terminus generally in the plane of said beam portion, said beam portion distal terminus being narrowed to a tip, said tip being radiused to define a gimbal locus, said beam portion tip being angled from said beam portion plane to exert a force against said flexure tongue portion toward said disk surface while permitting gimbaling movement of said tongue portion.

2. The disk drive suspension according to claim 1, in which said beam portion tip is angled from the plane of said beam portion first tapered continued extent at an angle between about 5 and 90 degrees relative to the plane of said beam portion.

3. The disk drive suspension according to claim 1, in which said load beam portions and said tip are unitary and formed from a common web of metal.

4. The disk drive suspension according to claim 1, in which said beam portion has a second tapered continued extent supported by said arm and defining said tip.

5. Disk drive suspension having a load beam with a base portion, a spring portion and an elongated beam portion having a distal terminus and left and right edge rails terminating adjacent said beam portion distal terminus, a flexure supported by said beam portion said flexure including a tongue portion opposite said beam portion distal terminus for connection to a slider flying above a disk surface, said beam portion having a first tapered continued extent beyond said edge rails to define an arm of lesser width than said beam portion, said arm projecting from said terminus generally in the plane of said beam portion, said beam portion distal terminus being narrowed to a tip, said tip being radiused to define a gimbal locus, said beam portion tip being angled from said beam portion plane to exert a force against said flexure tongue portion toward said disk surface while permitting gimbaling movement of said tongue portion in which said beam portion has left and right edge rails terminating adjacent said beam portion distal terminus, said beam portion having a first tapered continued extent beyond said edge rails to define an arm of lesser width than said beam portion projecting from said terminus generally in the plane of said beam portion, and a second tapered continued extent defining said tip.

6. The disk drive suspension according to claim 5, in which said second continued extent and its said tip are deflected toward said flexure tongue portion to engage said tip.

7. The disk drive suspension according to claim 6, in which said beam portion tip is angled from the plane of said beam portion first tapered continued extent at an angle between about 5 and 90 degrees relative to the plane of said first tapered continued extent.

8. The disk drive suspension according to claim 7, in which said load beam portions and said tip are unitary and formed from a common web of metal.

9. The disk drive suspension according to claim 8, in which said tip has a radius of about 0.003 to about 0.005 inch.

10. Disk drive suspension having a spring metal load beam with a base portion, a spring portion and an elongated beam portion having a distal terminus, a flexure attached to said beam portion, said flexure including a center tongue portion opposite said beam portion distal terminus for connection to a slider flying above a disk surface, said beam portion having a first tapered continued extent defining an arm of lesser width than said beam portion, said arm projecting from said distal terminus generally in the plane of said beam portion, said beam portion having a second tapered continued extent supported by said arm and narrowed to a tip radiused to define a gimbal locus, said radiused tip being angled from said beam portion plane at an angle of from about 5 to 90 degrees to the plane of said beam portion to exert a force against said flexure tongue portion toward said disk surface while permitting gimbaling movement of said tongue portion.

11. The disk drive suspension according to claim 10, in which said flexure tongue and said beam portion and its continued extent are free of dimple formations.

12. The method of resiliently urging a flexure tongue toward a disk surface, including supporting a flexure carrying said flexure tongue from a load beam extended in a plane and having left and right edge rails and a distal end, tapering a first continued extent of said load beam distal end beyond said edge rails to define an arm, supporting a second continued extent on said arm, deflecting said second continued extent at an angle of from about 5 to 90 degrees to said load beam plane, defining at the end of said second continued extent a tip, radiusing said tip, and engaging said radiused tip against said flexure tongue to urge said flexure tongue toward a disk surface in gimbaling relation.

* * * * *